US011577777B2

(12) United States Patent
Kataoka et al.

(10) Patent No.: US 11,577,777 B2
(45) Date of Patent: Feb. 14, 2023

(54) STEERING CONTROL DEVICE

(71) Applicants: JTEKT CORPORATION, Osaka (JP); TOYOTA JIDOSHA KABUSHIKI KAISHA, Toyota (JP)

(72) Inventors: Nobuaki Kataoka, Okazaki (JP); Takahiro Toko, Takahama (JP); Yukinobu Ezaki, Kasugai (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 16/419,087

(22) Filed: May 22, 2019

(65) Prior Publication Data
US 2019/0367085 A1 Dec. 5, 2019

(30) Foreign Application Priority Data
May 29, 2018 (JP) .............................. JP2018-102713

(51) Int. Cl.
*B62D 6/10* (2006.01)
*B62D 5/04* (2006.01)
*B62D 6/00* (2006.01)

(52) U.S. Cl.
CPC ............. *B62D 6/10* (2013.01); *B62D 5/0463* (2013.01); *B62D 6/002* (2013.01)

(58) Field of Classification Search
CPC ........ B62D 6/10; B62D 5/0463; B62D 6/002; B62D 5/0484; B62D 5/0469; B62D 5/04; B62D 6/00
(Continued)

(56) References Cited

U.S. PATENT DOCUMENTS

2007/0205041 A1\* 9/2007 Nishizaki ............. B62D 5/0472
180/446
2007/0284180 A1\* 12/2007 Suehiro ................ B62D 5/0469
180/444
(Continued)

FOREIGN PATENT DOCUMENTS

EP 3045379 A1 7/2016
JP 2008049914 A \* 3/2008
(Continued)

OTHER PUBLICATIONS

JP 2008049914—Kobayashi 2008—English Translation (Year: 2008).\*
(Continued)

*Primary Examiner* — Scott A Reinbold
(74) *Attorney, Agent, or Firm* — Oliff PLC

(57) ABSTRACT

A steering control device includes a microcomputer. The microcomputer is configured to calculate a torque command value that is a target value of a motor torque, set a restricting value that is an upper limit of an absolute value of the torque command value, restrict the absolute value of the torque command value to be equal to or less than the restricting value, control driving of a motor such that the motor torque follows the restricted torque command value, calculate a steering angle restricting value that decreases based on an increase of an absolute value of a rotation angle, and an absolute value of an angular velocity, when the absolute value of the rotation angle of the rotary shaft exceeds a steering angle threshold, and set the restricting value to be a value equal to or less than the steering angle restricting value.

3 Claims, 4 Drawing Sheets

(58) Field of Classification Search
USPC .......................................................... 180/449
See application file for complete search history.

(56) References Cited

U.S. PATENT DOCUMENTS

| | | | | |
|---|---|---|---|---|
| 2008/0281490 | A1* | 11/2008 | Wittig | B62D 5/0457 |
| | | | | 701/41 |
| 2018/0079447 | A1* | 3/2018 | Yamashita | B62D 5/0469 |
| 2018/0167004 | A1* | 6/2018 | Suzuki | H02P 6/08 |
| 2018/0346018 | A1* | 12/2018 | Kataoka | B62D 15/0245 |

FOREIGN PATENT DOCUMENTS

| | | | | |
|---|---|---|---|---|
| JP | 2015-020506 | A | | 2/2015 |
| JP | 2015020506 | A | * | 2/2015 |
| JP | 2016-112954 | A | | 6/2016 |

OTHER PUBLICATIONS

Oct. 23, 2019 extended European Search Report issued in European Patent Application No. 19176750.8.
May 10, 2022 Office Action issued in Japanese Patent Application No. 2018-102713.

* cited by examiner

STEERING CONTROL DEVICE

INCORPORATION BY REFERENCE

The disclosure of Japanese Patent Application No. 2018-102713 filed on May 29, 2018 including the specification, drawings and abstract is incorporated herein by reference in its entirety.

BACKGROUND

1. Technical Field

The disclosure relates to a steering control device.

2. Description of Related Art

An electric power steering (EPS) system including an actuator having a motor as a driving source is known as a steering device for a vehicle. There is an EPS system that acquires a steering angle of a steering wheel (a turning angle of steered wheels) as an absolute angle including a range exceeding 360 degrees, and that performs various controls based on the steering angle. For example, Japanese Unexamined Patent Application Publication No. 2015-20506 (JP 2015-20506 A) describes, an EPS system that mitigates an end abutting impact by increasing a steering reaction force before a rack end that is an end portion of a rack shaft is in contact with a rack housing.

SUMMARY

In the configuration of JP 2015-20506 A described above, a torque command value (q-axis current command value) that is a target value of a motor torque output by the motor is calculated by subtracting a correction value that is calculated based on an absolute value of the steering angle, from a basic current command value based on a steering torque and a vehicle speed. The correction value may be set to a large value such that when the absolute value of the steering angle exceeds an end vicinity steering angle of a rack end vicinity by a certain amount, a steering reaction force disabling further steering by human force is applied by the motor. If the acquired steering angle is an incorrect value due to an abnormality of a steering sensor that detects a steering angle etc., even if a steering operation is not actually performed to the rack end vicinity, the steering operation would be hindered. There is still room for improvement regarding this point.

The correction value may be calculated based on the rotation angle of the rotary shaft that is able to be converted into the turning angle of the steered wheels, other than on the steering angle. However, if the rotation angle is an incorrect value, the same problem arises.

The disclosure provides a steering control device that is able to suppress a steering operation from being hindered, even when the detected rotation angle of the rotary shaft that is able to be converted into the turning angle of the steered wheels is an incorrect value.

The steering control device according to an aspect of the disclosure controls a steering device to which a motor torque that causes a steered shaft coupled to steered wheels to reciprocate is applied by an actuator including a motor as a driving source. The steering control device includes a microcomputer. The microcomputer is configured to calculate a torque command value that is a target value of a motor torque output by the motor, set a restricting value that is an upper limit of an absolute value of the torque command value, restrict the absolute value of the torque command value to be equal to or less than the restricting value, control driving of the motor such that the motor torque follows the restricted torque command value, calculate a steering angle restricting value that decreases based on an increase of an absolute value of a rotation angle of the rotary shaft, the rotation angle of which is able to be converted into a turning angle of steered wheels, and the absolute value of the angular velocity of the rotary shaft, when the absolute value of the rotation angle of the rotary shaft exceeds a steering angle threshold based on the steering device, and set the restricting value to be a value equal to or less than the steering angle restricting value.

In the aspect described above, the steering angle restricting value is calculated so as to decrease when the absolute value of the rotation angle of the rotary shaft that is able to be converted into the turning angle of the steered wheels exceeds the steering angle threshold. The torque command value that is the target value of the motor torque output from the motor is restricted so as to be equal to or less than the restricting value that is set to be equal to or less than the steering angle restricting value. The absolute value of the torque command value only decreases based on the restricting value. Suppose the steering angle restricting value is calculated based on a rotation angle and an angular velocity that are incorrect and the restricting value is set in consideration of the steering angle restricting value. Even in such a case, it is possible to suppress a situation where a steering reaction force disabling further steering by human force is applied from the motor and the steering operation is hindered when the rotation angle does not exceed the steering angle threshold.

In the aspect described above, the steering angle restricting value is calculated based on the absolute value of the rotation angle and the absolute value of the angular velocity. The motor torque is restricted to be equal to or less than the steering angle restricting value. The rotation angle is restricted from increasing further when the rotation angle exceeds the steering angle threshold, and the angular velocity is restricted when the rotation angle exceeds the steering angle threshold. For example, suppose the steering operation is performed to the end vicinity when the steering angle threshold is set to a value at the end vicinity. In such a case, the motor torque is restricted and the rotation angle and the angular velocity of the rotary shaft are restricted. It is thus possible to suitably mitigate the end abutting impact.

In the aspect described above, the microcomputer is configured to calculate the steering angle restricting value based on a value resulting from subtracting an angle restricting component and a speed restricting component from a rated torque that is set beforehand as a motor torque that is able to be output by the motor, the angle restricting component is calculated so as to increase based on the increase of the absolute value of the rotation angle when the absolute value of the rotation angle exceeds the steering angle threshold, and the speed restricting component is calculated so as to increase based on an increase of an exceeding amount of the angular velocity with respect to an upper limit angular velocity based on the absolute value of the rotation angle.

In the configuration described above, the steering angle restricting value is calculated by subtracting the angle restricting component and the speed restricting component from the rated torque. It is thus possible to easily calculate the steering angle restricting value that is able to restrict the rotation angle from increasing further and restrict the angular velocity when the rotation angle exceeds the steering angle threshold.

In the configuration described above, at least one of the angle restricting component and the speed restricting component may be calculated so as to decrease based on an increase of a vehicle speed. With the configuration described above, when the vehicle speed is high, the steering angle restricting value does not tend to decrease. Thus, for example, the restricting value is suppressed from decreasing during high speed traveling and when an emergency steering operation is performed to avoid an obstacle, it is possible to suppress the steering operation from being hindered.

In the aspect described above, the microcomputer may be configured to set, as the restricting value, a smallest one of another restricting value and the steering angle restricting value. Here, the other restricting value may be set based on a state quantity other than the rotation angle and the angular velocity.

With the configuration described above, the restricting value is set in consideration of a state in which the motor torque needs to be restricted, besides a state in which the rotation angle exceeds the steering angle threshold. It is thus possible to appropriately restrict the motor torque based on various states. Since the smallest one of the other restricting value and the steering angle restricting value is set as the restricting value, the restricting value does not exceed the steering angle restricting value. For example, when the steering angle restricting value is set to a value at the end vicinity, it is possible to suitably mitigate end abutting impact.

With the aspects described above, when the rotation angle of the rotary shaft that is able to be converted into the detected turning angle of the steered wheels is an incorrect value, it is possible to suppress the steering operation from being hindered.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
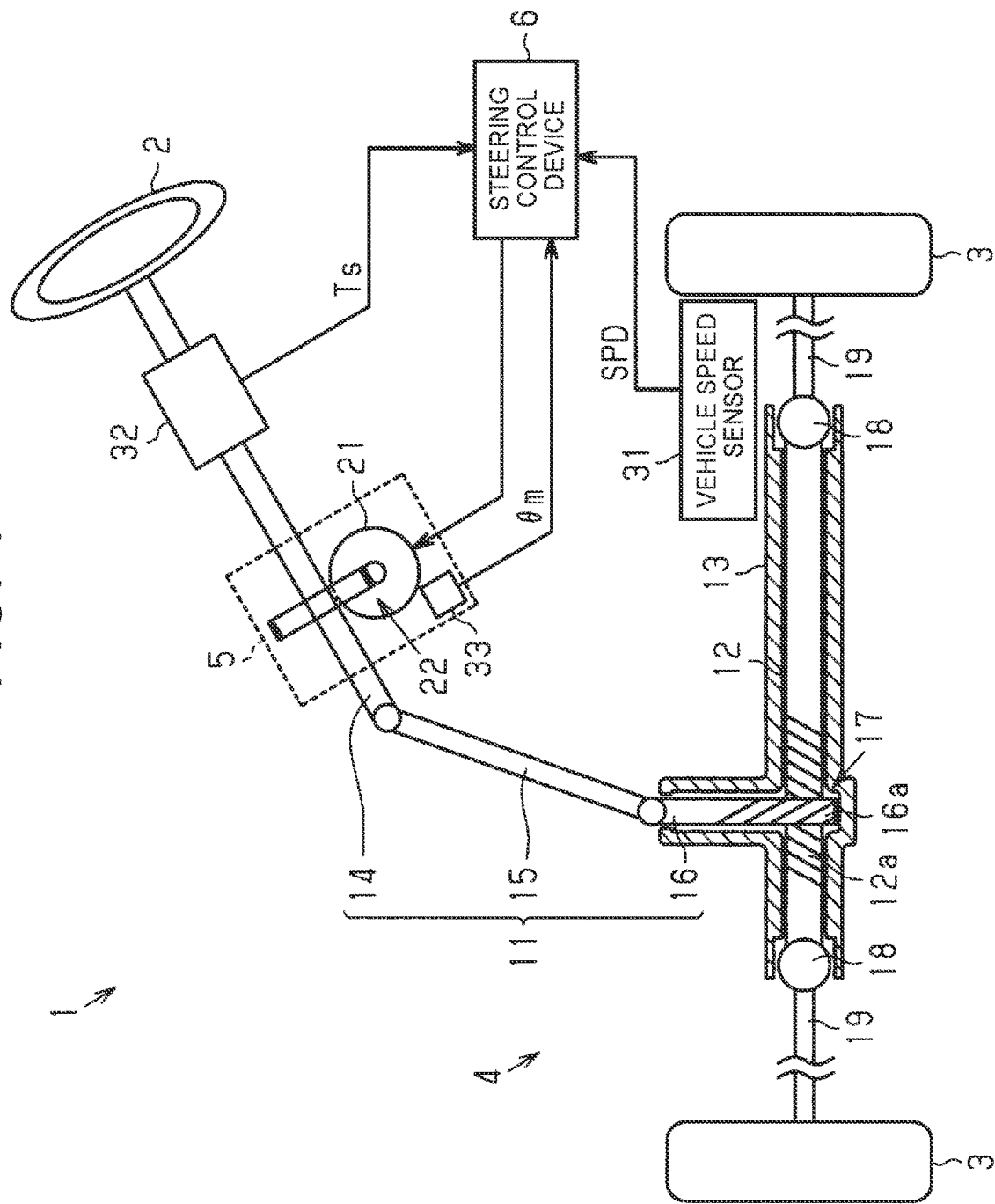
FIG. 1 is a schematic diagram of an electric power steering system.

Hereinafter, an embodiment of a steering control device will be described with reference to the drawings. As illustrated in FIG. 1, an electric power steering (EPS) system 1 that serves as a steering device to be controlled has a steering mechanism 4 that steers steered wheels 3 based on an operation of a steering wheel 2 by a driver. The EPS system 1 includes an EPS actuator 5 that serves an actuator that applies assist force to the steering mechanism 4 for assisting a steering operation and a steering control device 6 that controls an operation of the EPS actuator 5.

The steering mechanism 4 includes a steering shaft 11 to which the steering wheel 2 is fixed, a rack shaft 12 that serves as a steered shaft which reciprocates in an axial direction depending on a rotation of the steering shaft 11, and a rack housing 13 that has a generally cylindrical shape and in which the rack shaft 12 is inserted so as to be reciprocable. The steering shaft 11 is formed by coupling a column shaft 14, an intermediate shaft 15, and a pinion shaft 16 that are arranged in the stated order from the steering wheel 2 side.

The rack shaft 12 and the pinion shaft 16 are disposed in the rack housing 13 with a prescribed crossing angle formed therebetween, and rack teeth 12a formed on the rack shaft 12 and pinion teeth 16a formed on the pinion shaft 16 are meshed with each other, whereby a rack-and-pinion mechanism 17 is provided. Tie rods 19 are rotatably coupled to opposite ends of the rack shaft 12 via rack ends 18 comprised of ball joints provided on shaft end portions. Distal ends of the tie rods 19 are coupled to knuckles, not shown, to which the steered wheels 3 are installed. In the EPS system 1, a rotation of the steering shaft 11 in accordance with the steering operation is converted into an axial motion of the rack shaft 12 by the rack and pinion mechanism 17. The axial motion is transmitted to the knuckles via the tie rods 19 and thus, the turning angle of the steered wheels 3, that is, a moving direction of a vehicle is changed.

A position at which the rack end 18 abuts against a left end of the rack housing 13 is a rightmost position to which the steering operation is able to be performed. The same position can be regarded as a rack end position serving as a right end position. A position at which the rack end 18 abuts against a right end of the rack housing 13 is a leftmost position to which the steering operation is able to be performed. The same position can be regarded as a rack end position serving as a left end position.

The EPS actuator 5 includes a motor 21 that is a driving source, and a speed reducing mechanism 22 such as a worm and wheel coupled to the motor 21 as well as the column shaft 14. The EPS actuator 5 reduces the speed of rotation output from the motor 21 with the speed reducing mechanism 22 and transmits the rotation to the column shaft 14 so as to apply a motor torque Tm to the steering mechanism 4 as an assist force. A three-phase brushless motor is adopted as the motor 21 of the embodiment.

A vehicle speed sensor 31 that detects a vehicle speed SPD of the vehicle and a torque sensor 32 that detects a steering torque Ts applied to the steering shaft 11 in accordance with a steering operation of the driver are connected to the steering control device 6. A rotation sensor 33 that detects a motor angle θm of the motor 21 as a relative angle within a range of zero to 360 degrees is connected to the steering control device 6. The steering torque Ts and the motor angle θm are detected as a positive value when steering operation is performed in one direction (right, in the embodiment) and a negative value when steering operation is performed in the other direction (left, in the embodiment). The steering control device 6 supplies drive power to the motor 21 based on signals indicating state quantities input from the sensors and a signal indicating state quantity of the motor 21. In this way, the steering control device 6 controls the operation of the EPS actuator 5, that is, an assist force applied to the steering mechanism 4 such that the rack shaft 12 reciprocates.

Figure 2:
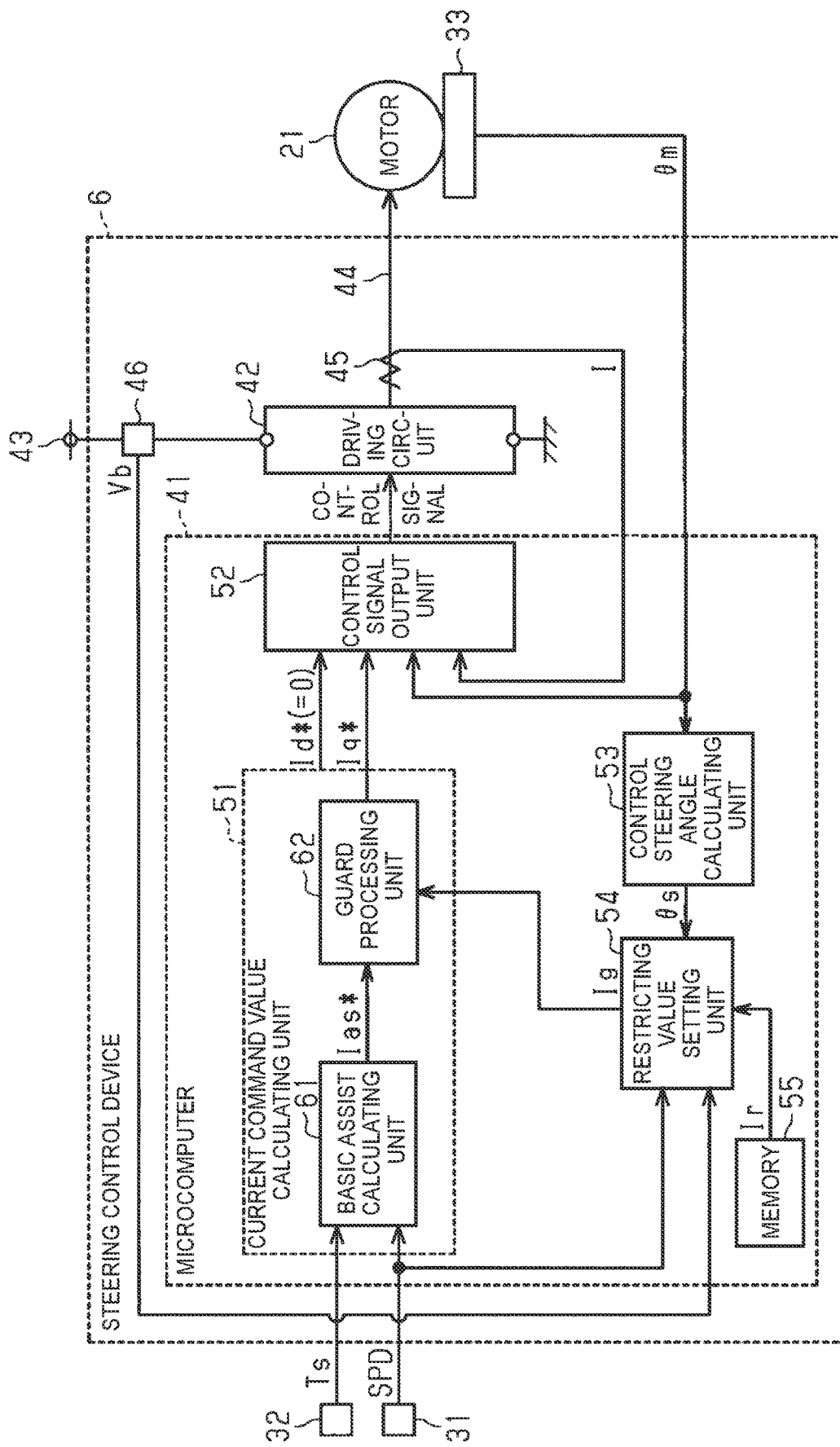
FIG. 2 is a block diagram of a steering control device.

As illustrated in FIG. 2, the steering control device 6 includes a microcomputer 41 that outputs a control signal and a driving circuit 42 that supplies drive power to the motor 21 based on the control signal. A known PWM inverter that has a plurality of switching elements (such as a field effect transistor (FET)) is adopted as the driving circuit 42 of the embodiment. The control signal output by the microcomputer 41 defines an on-state and an off-state of the switching elements. The switching elements are turned on or off in response to the control signal, and patterns of electrical conduction to a motor coil of each phase are switched. As a result, direct current power from an on-vehicle power source 43 is converted into three-phase drive power and the converted drive power is output to the motor 21. Control blocks described below are realized by a computer program executed by the microcomputer 41. The state quantities are detected at a prescribed sampling period (detecting period) and calculating processes indicated in the following control blocks are executed at every prescribed calculating period.

The vehicle speed SPD, the steering torque Ts, and the motor angle θm of the motor 21 described above are input to the microcomputer 41. Phase current values I of the respective phases of the motor 21 are input to the microcomputer 41. The phase current values I are detected by current sensors 45 provided on connecting lines 44 between the driving circuit 42 and three-phase motor coils. For the purpose of convenience of explanation, the three-phase connecting lines are collectively illustrated as one connecting line and the phase current sensors 45 are collectively illustrated as one current sensor 45. A voltage sensor 46 that detects a power source voltage Vb of the on-vehicle power source 43 is connected to the microcomputer 41. The microcomputer 41 outputs the control signal based on the state quantities.

Specifically, the microcomputer 41 includes a current command value calculating unit 51 and a control signal output unit 52. The current command value calculating unit 51 calculates a target value of power supplied to the motor 21, that is, current command values Id*, Iq* corresponding to a target assist force. The control signal output unit 52 outputs the control signal based on the current command values Id*, Iq*. The current command values Id*, Iq* are target values of a current to be supplied to the motor 21. The current command values Id*, Iq* indicate a d-axis current command value and a q-axis current command value respectively, in a d/q coordinate system. The q-axis current command value Iq* is regarded as a torque command value that is a target value of an output torque of the motor 21 and the current command value calculating unit 51 is regarded as a torque command value calculating unit. In the embodiment, the d-axis current command value Id* is basically fixed to zero.

The microcomputer 41 has a control steering angle calculating unit 53 that calculates, based on the motor angle θm of the motor 21, a control steering angle θs that indicates a rotation angle (steering angle) of the steering shaft 11 that is a rotary shaft. The rotation angle (steering angle) is able to be converted into a turning angle of the steered wheels 3. The control steering angle calculating unit 53 integrates (counts) the number of rotations of the motor 21, with the control steering angle θs when the rack shaft 12 is at a steering neutral position as an origin position (zero degrees). The control steering angle calculating unit 53 calculates the control steering angle θs as an absolute angle including a range exceeding 360 degrees, based on the number of rotations and the motor angle θm. Similar to the motor angle θm of the motor 21, the control steering angle θs is set as a positive value when the control steering angle θs is a rotation angle in one direction from the steering neutral position, whereas the control steering angle θs is set as a negative value when the control steering angle θs is a rotation angle in the other direction. The current command values Id*, Iq* are set as positive values when assisting steering to one direction, whereas the current command values Id*, Iq* are set as negative values when assisting steering to the other direction. The microcomputer 41 has a restricting value setting unit 54 that sets a restricting value Ig that is an upper limit of the q-axis current command value Iq*, and a memory 55. A rated current Ir conforming to a rated torque is stored in the memory 55, in which the rated torque is set beforehand as a motor torque that the motor 21 is able to output.

More specifically, the current command value calculating unit 51 has a basic assist calculating unit 61 and a guard processing unit 62. The basic assist calculating unit 61 calculates a basic current command value Ias* that is a basic component of the q-axis current command value Iq*. The guard processing unit 62 restricts an absolute value of the basic current command value Ias* (q-axis current command value Iq*) to be equal to or less than the restricting value Ig.

The steering torque Ts and the vehicle speed SPD are input to the basic assist calculating unit 61. The basic assist calculating unit 61 then calculates the basic current command value Ias* based on the steering torque Ts and the vehicle speed SPD. Specifically, the absolute value of the basic current command value Ias* calculated by the basic assist calculating unit 61 becomes larger, as the absolute value of the steering torque Ts becomes larger and the vehicle speed SPD becomes lower. The basic current command value Ias* calculated in this way is input to the guard processing unit 62.

In addition to the basic current command value Ias*, the restricting value Ig that is set by the restricting value setting unit 54 as described below is input to the guard processing unit 62. When the absolute value of the input basic current command value Ias* is equal to or less than the restricting value Ig, the guard processing unit 62 outputs the basic current command value Ias* as it is to the control signal output unit 52 as the q-axis current command value Iq*. In contrast, when the absolute value of the input basic current command value Ias* is larger than the restricting value Ig, the guard processing unit 62 restricts the absolute value of the basic current command value Ias* to the restricting value Ig and outputs the restricted basic current command value Ias* to the control signal output unit 52 as the q-axis current command value Iq*.

The control signal output unit 52 executes current feedback control in the d/q coordinate system based on the current command values Id*, Iq*, the phase current values I, and the motor angle θm of the motor 21, and generates the control signal. Specifically, the control signal output unit 52 maps the phase current values I on the d/q coordinate system based on the motor angle θm, and calculates the d-axis current value and the q-axis current value, which are actual current values of the motor 21 in the d/q coordinate system. The control signal output unit 52 executes current feedback control and generates the control signal such that the d-axis current value follows the d-axis current command value Id* and the q-axis current value follows the q-axis current command value Iq*. The control signal is output to the driving circuit 42 and the drive power is supplied to the motor 21 based on the control signal. The driving of the motor 21 is thus controlled such that the motor torque output by the motor 21 follows the torque command value based on the q-axis current command value Iq*.

The configuration of the restricting value setting unit 54 will be described. The control steering angle θs, the vehicle speed SPD, the power source voltage Vb, and the rated current Ir stored in the memory 55 are input to the restricting value setting unit 54. The restricting value setting unit 54 sets the restricting value Ig based on the above state quantities.

Figure 3:
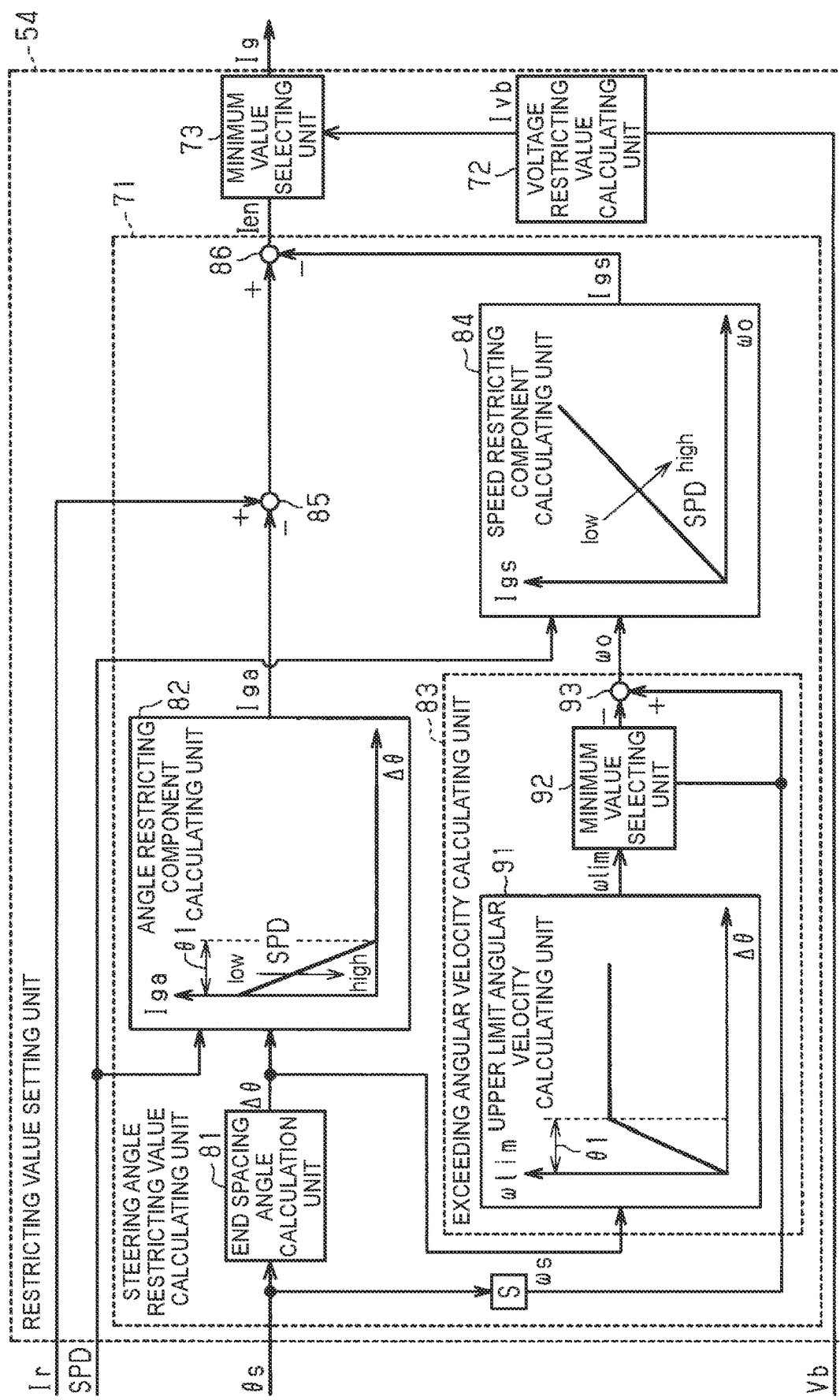
FIG. 3 is a block diagram of a restricting value setting unit.

Specifically, as shown in FIG. 3, the restricting value setting unit 54 includes a steering angle restricting value calculating unit 71, a voltage restricting value calculating unit 72, and a minimum value selecting unit 73. The steering angle restricting value calculating unit 71 calculates a steering angle restricting value Ien based on the control steering angle $\theta s$. The voltage restricting value calculating unit 72 calculates a voltage restricting value Ivb based on the power source voltage Vb. The minimum value selecting unit 73 selects a smaller one of the steering angle restricting value Ien and the voltage restricting value Ivb.

The control steering angle $\theta s$, the vehicle speed SPD, and the rated current Ir are input to the steering angle restricting value calculating unit 71. The steering angle restricting value calculating unit 71 calculates the steering angle restricting value Ien that decreases as the absolute value of a control angular velocity $\omega s$ (steering speed) and the absolute value of the control steering angle $\theta s$ increase, when the absolute value of the control steering angle $\theta s$ exceeds an end vicinity steering angle $\theta ne$ as described below based on the state quantities. Here, the control angular velocity $\omega s$ is acquired by differentiating the control steering angle $\theta s$. The steering angle restricting value Ien calculated in this way is output to the minimum value selecting unit 73. The end vicinity steering angle $\theta ne$ is set such that the absolute value indicates an angle that is smaller than the control steering angle $\theta s$ at the rack end position by a prescribed angle $\theta 1$. The prescribed angle $\theta 1$ is a relatively small angle such that the end vicinity steering angle $\theta ne$ is not spaced too far away from the rack end position.

The power source voltage Vb is input to the voltage restricting value calculating unit 72. When the absolute value of the power source voltage Vb is equal to or less than a voltage threshold Vth that is set beforehand, the voltage restricting value calculating unit 72 calculates a voltage restricting value Ivb that is smaller than a rated voltage for supplying the rated current Ir. Specifically, when the absolute value of the power source voltage Vb is equal to or less than the voltage threshold Vth, the voltage restricting value calculating unit 72 calculates a voltage restricting value Ivb that has a smaller absolute value based on the decrease of the absolute value of the power source voltage Vb. The voltage restricting value Ivb calculated in this way is output to the minimum value selecting unit 73.

The minimum value selecting unit 73 selects, as the restricting value Ig, a smaller one of the steering angle restricting value Ien and the voltage restricting value Ivb that are input, and outputs the restricting value Ig to the guard processing unit 62 (see FIG. 2). The configuration of the steering angle restricting value calculating unit 71 will be described.

The steering angle restricting value calculating unit 71 includes an end spacing angle calculating unit 81 and an angle restricting component calculating unit 82. The end spacing angle calculating unit 81 calculates an end spacing angle $\Delta\theta$ that is a difference between the control steering angle $\theta s$ during the latest calculating period and the control steering angle $\theta s$ at one of the right or left rack end positions. The angle restricting component calculating unit 82 calculates an angle restricting component Iga that is a current (torque) restricting amount that is set based on the end spacing angle $\Delta\theta$. The steering angle restricting value calculating unit 71 includes an exceeding angular velocity calculating unit 83 and a speed restricting component calculating unit 84. The exceeding angular velocity calculating unit 83 calculates an exceeding angular velocity $\omega o$ that is an exceeding amount of the control angular velocity $\omega s$ with respect to an upper limit angular velocity $\omega lim$ that is set based on the end spacing angle $\Delta\theta$. The speed restricting component calculating unit 84 calculates a speed restricting component Igs that is a current (torque) restricting amount that is set based on the exceeding angular velocity $\omega o$.

Specifically, the control steering angle $\theta s$ is input to the end spacing angle calculating unit 81. The end spacing angle calculating unit 81 calculates a difference between the control steering angle $\theta s$ during the latest calculating period and the control steering angle $\theta s$ at the left rack end position, and a difference between the control steering angle $\theta s$ during the latest calculating period and the control steering angle $\theta s$ at the right rack end position. The end spacing angle calculating unit 81 outputs an absolute value of a smaller one of the calculated differences as the end spacing angle $\Delta\theta$ to the angle restricting component calculating unit 82 and the exceeding angular velocity calculating unit 83.

The end spacing angle $\Delta\theta$ and the vehicle speed SPD are input to the angle restricting component calculating unit 82. The angle restricting component calculating unit 82 has a map that sets a relationship between the end spacing angle $\Delta\theta$, the vehicle speed SPD, and the angle restricting component Iga. The angle restricting component calculating unit 82 refers to the map and calculates the angle restricting component Iga based on the end spacing angle $\Delta\theta$ and the vehicle speed SPD. In the map, the angle restricting component Iga is the largest when the end spacing angle $\Delta\theta$ is zero and decreases in proportion to the increase in the end spacing angle $\Delta\theta$. The angle restricting component Iga is set to be zero when the end spacing angle $\Delta\theta$ is larger than the prescribed angle $\theta 1$ (when the absolute value of the control steering angle $\theta s$ is larger than the end vicinity steering angle $\theta ne$). The map is set such that the angle restricting component Iga decreases as the vehicle speed SPD increases, in a region in which the end spacing angle $\Delta\theta$ is equal to or less than the prescribed angle $\theta 1$. The angle restricting component Iga calculated in this way is output to a subtracter 85.

The control angular velocity $\omega s$ that is acquired by differentiating the end spacing angle $\Delta\theta$ and the control steering angle $\theta s$ are input to the exceeding angular velocity calculating unit 83. The exceeding angular velocity calculating unit 83 has an upper limit angular velocity calculating unit 91 to which the end spacing angle $\Delta\theta$ is input. The upper limit angular velocity calculating unit 91 has a map that sets a relationship between the end spacing angle $\Delta\theta$ and the upper limit angular velocity $\omega lim$. The upper limit angular velocity calculating unit 91 refers to the map and calculates the upper limit angular velocity $\omega lim$ based on the end spacing angle $\Delta\theta$. In this map, the upper limit angular velocity $\omega lim$ is set such that the upper limit angular velocity $\omega lim$ is the smallest when the end spacing angle $\Delta\theta$ is zero and the upper limit angular velocity $\omega lim$ increases in proportion to the increase in the end spacing angle $\Delta\theta$. The upper limit angular velocity $\omega lim$ is set so as to be constant at a value set beforehand, in which the value is a maximum angular velocity at which the motor 21 is able to be rotated, when the end spacing angle $\Delta\theta$ is larger than the prescribed angle $\theta 1$.

When the absolute value of the control angular velocity $\omega s$ is larger than the upper limit angular velocity $\omega lim$ calculated in the upper limit angular velocity calculating unit 91, the exceeding angular velocity calculating unit 83 outputs to the speed restricting component calculating unit 84, the exceeding amount of the control angular velocity ωs with respect to the upper limit angular velocity ωlim as the exceeding angular velocity ωo. In contrast, when the absolute value of the control angular velocity ωs is equal to or less than the upper limit angular velocity ωlim, the exceeding angular velocity calculating unit 83 outputs to the speed restricting component calculating unit 84, the exceeding angular velocity ωo indicating zero. Specifically, the exceeding angular velocity calculating unit 83 has a minimum value selecting unit 92 to which the upper limit angular velocity ωlim and the control angular velocity ωs are input. The minimum value selecting unit 92 selects a smaller one of the absolute values of the upper limit angular velocity ωlim and the control angular velocity ωs, and outputs the smaller absolute value to a subtracter 93. In the subtracter 93, the exceeding angular velocity calculating unit 83 then subtracts the output value of the minimum value selecting unit 92 from the absolute value of the control angular velocity ωs, and calculates the exceeding angular velocity ωo. In this way, in the minimum value selecting unit 92, a smaller one of the absolute values of the upper limit angular velocity ωlim and the control angular velocity ωs is selected. When the control angular velocity ωs is equal to or less than the upper limit angular velocity ωlim, the control angular velocity ωs is subtracted from the control angular velocity ωs in the subtracter 93 and thus, the exceeding angular velocity ωo is zero. In contrast, when the control angular velocity ωs is larger than the upper limit angular velocity ωlim, the upper limit angular velocity ωlim is subtracted from the absolute value of the control angular velocity ωs in the subtracter 93, and the exceeding angular velocity ωo is the exceeding amount of the control angular velocity ωs with respect to the upper limit angular velocity ωlim.

The exceeding angular velocity ωo and the vehicle speed SPD are input to the speed restricting component calculating unit 84. The speed restricting component calculating unit 84 has a map that sets a relationship between the exceeding angular velocity ωo and the speed restricting component Igs. The speed restricting component calculating unit 84 refers to the map and calculates the speed restricting component Igs based on the exceeding angular velocity ωo and the vehicle speed SPD. In this map, the speed restricting component Igs is set such that the speed restricting component Igs is the smallest when the exceeding angular velocity ωo is zero and the speed restricting component Igs increases in proportion to the increase in the exceeding angular velocity ωo. The map is set such that the speed restricting component Igs decreases based on the increase of the vehicle speed SPD. The speed restricting component Igs calculated in this way is output to a subtracter 86.

The rated current Ir is input to the subtracter 85, to which the angle restricting component Iga is input. The steering angle restricting value calculating unit 71 outputs a value resulting from subtracting the angle restricting component Iga from the rated current Ir to the subtracter 86, to which the speed restricting component Igs is input. In the subtracter 86, the speed restricting component Igs is subtracted from the output value of the subtracter 85, that is, the angle restricting component Iga and the speed restricting component Igs are subtracted from the rated current Ir. The steering angle restricting value calculating unit 71 then outputs the subtracted value to the minimum value selecting unit 73, as the steering angle restricting value Ien.

Figure 4:
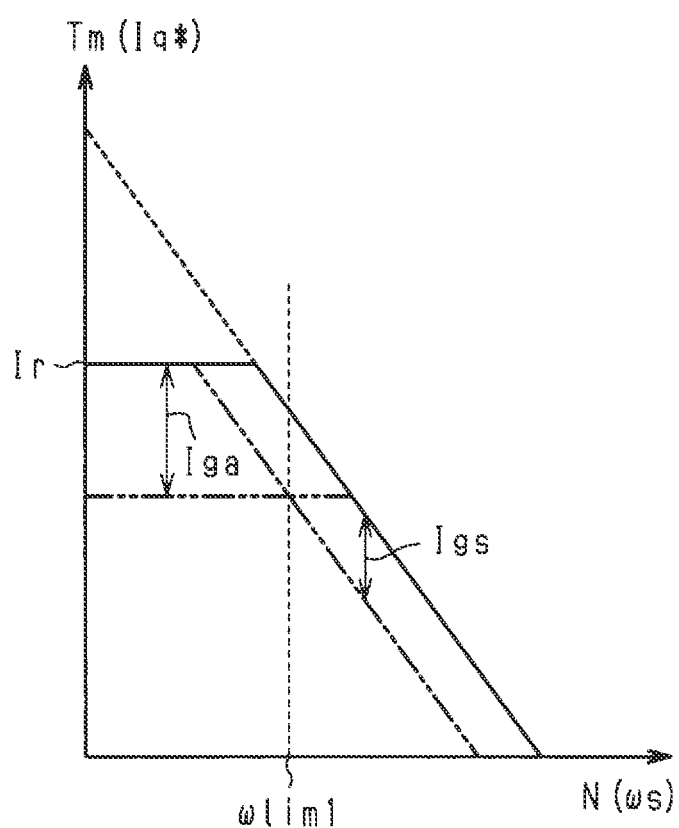
FIG. 4 is a graph illustrating an example of a relationship (N-T characteristics) between a motor torque (q-axis current command value) and a rotational speed (control angular velocity) output by a motor.

Mitigation of end abutting impact due to setting the steering angle restricting value Ien as the restricting value Ig will be described below. FIG. 4 illustrates an example of a relationship (N-T characteristics) between the motor torque Tm (q-axis current command value Iq*) and a rotational speed N (control angular velocity ωs) output by the motor 21. As illustrated in FIG. 4, the motor torque Tm decreases in proportion to the increase in the rotational speed N. This is due to an induced voltage increasing as the rotational speed N increases, which leads to current being less supplied to the motor 21. For example, suppose the power source voltage Vb is not decreased, the control steering angle θs is near the steering neutral position, and the restricting value Ig is equal to the rated current Ir (when the q-axis current command value Iq* is not restricted). In such a case, the motor torque Tm and the rotational speed N that are indicated by a relationship in a region surrounded by a continuous line in FIG. 4 are able to be output from the motor 21.

Suppose the upper limit angular velocity ωlim reaches a prescribed upper limit angular velocity ωlim1, and the restricting value Ig is set to the steering angle restricting value Ien that is smaller than the rated current Ir, since steering operation is performed to the rack end vicinity. As described above, the steering angle restricting value Ien is a value resulting from subtracting the angle restricting component Iga and the speed restricting component Igs from the rated current Ir. The motor torque Tm is restricted by the angle restricting component Iga based on the magnitude of the end spacing angle Δθ and is restricted by the speed restricting component Igs based on the exceeding amount of the control angular velocity ωs with respect to the prescribed upper limit angular velocity ωlim1. Consequently, only the motor torque Tm and the rotational speed N indicated by the relationship in the region surrounded by long dashed double-short dashed lines are able to be output from the motor 21. As a result, when the basic current command value Ias* based on the steering torque Ts applied by the driver is outside the region surrounded by the long dashed double-short dashed line, the assist force supplied by the motor 21 is insufficient and the steering operation of the driver is hindered and thus, end abutting impact is mitigated. In the embodiment, not only is the end spacing angle Δθ restricted from decreasing when the end spacing angle Δθ is equal to or less than the prescribed angle θ1, the control angular velocity ωs also is restricted when the end spacing angle Δθ is equal to or less than the prescribed angle θ1 and thus, end abutting impact is mitigated.

Functions and effects of the embodiment will be described. The steering angle restricting value Ien is calculated so as to decrease when the absolute value of the control steering angle θs exceeds the end vicinity steering angle θne. The q-axis current command value Iq* is restricted so as to be equal to or less than the restricting value Ig that is set to be equal to or less than the steering angle restricting value Ien. In the embodiment, the absolute value of the q-axis current command value Iq* only decreases based on the restricting value Ig. Suppose the steering angle restricting value Ien is calculated based on a control steering angle θs and a control angular velocity ωs that are incorrect and the steering angle restricting value Ien is set as the restricting value Ig. Even in such a case, it is possible to suppress a situation where a steering reaction force disabling further steering by human force is applied by the motor 21 and steering operation is hindered when the control steering angle θs does not exceed the end vicinity steering angle θne.

The steering angle restricting value Ien is calculated based on the absolute value of the control steering angle θs and the absolute value of the control angular velocity ωs. The motor torque Tm is restricted to be equal to or less than the restricting value Ig. The control steering angle θs is restricted from increasing even further when the control steering angle θs exceeds the end vicinity steering angle θne, and the control angular velocity ωs is also restricted when the control steering angle θs exceeds the end vicinity steering angle θne. Since the motor torque Tm is restricted when the steering operation is performed to the end vicinity, the control steering angle θs and the control angular velocity ωs are restricted, and thus, it is possible to suitably mitigate end abutting impact.

The steering angle restricting value calculating unit 71 calculates the steering angle restricting value Ien by subtracting the angle restricting component Iga and the speed restricting component Igs from the rated current Ir. When the control steering angle θs exceeds the end vicinity steering angle θne, it is thus possible to restrict the control steering angle θs from increasing even further and easily calculate the steering angle restricting value Ien that is able to restrict the control angular velocity ωs.

The angle restricting component Iga and the speed restricting component Igs are calculated so as to decrease based on the increase of the vehicle speed SPD. Thus, when the vehicle speed SPD is high, the steering angle restricting value Ien does not tend to decrease. Thus, for example, the restricting value Ig is suppressed from decreasing during high speed traveling and when an emergency steering operation is performed to avoid an obstacle, it is possible to suppress the steering operation from being hindered.

The restricting value setting unit 54 sets, as the restricting value Ig, the smaller one of the voltage restricting value Ivb that is set based on the power source voltage Vb and the steering angle restricting value Ien. It is thus possible to appropriately restrict the motor torque Tm based on a state in which the power source voltage Vb is decreased other than the state in which the control steering angle θs exceeds the end vicinity steering angle θne. Since the smaller one of the voltage restricting value Ivb and the steering angle restricting value Ien is set as the restricting value Ig, the restricting value Ig does not exceed the steering angle restricting value Ien and it is thus possible to suitably mitigate the end abutting impact.

The embodiment may be modified as follows. The embodiment and the modification may be combined with each other to the extent that there is no technical contradiction. In the embodiment described above, the restricting value setting unit 54 includes the steering angle restricting value calculating unit 71 and the voltage restricting value calculating unit 72. However, the configuration is not limited to this, and the microcomputer 41 may include the restricting value setting unit 54, the steering angle restricting value calculating unit 71, and the voltage restricting value calculating unit 72 as parallel functions. The restricting value setting unit 54 may function as the guard processing unit 62. The guard processing unit 62 may function as the restricting value setting unit 54, the steering angle restricting value calculating unit 71, and the voltage restricting value calculating unit 72. The configuration of the control blocks of the microcomputer 41 may be changed as needed.

In the embodiment described above, a value resulting from applying guard processing to the basic current command value Ias* based on the restricting value Ig is set as the q-axis current command value Iq*. However, the q-axis current command value Iq* is not limited to this, and may be a value resulting from applying guard processing, based on the restricting value Ig, to the basic current command value Ias* in which the basic current command value Ias* is compensated by a compensation amount based on a differential value of the steering torque Ts, for example.

In the embodiment, the restricting value setting unit 54 has the voltage restricting value calculating unit 72 that calculates the voltage restricting value Ivb based on the power source voltage Vb. However, the restricting value setting unit 54 is not limited to this, and may have another calculating unit that calculates another restricting value based on another state quantity in addition to or instead of the voltage restricting value calculating unit 72. For example, an overheat protection restricting value calculating unit that calculates a small overheat protection restricting value based on the rise in temperature of the motor 21 may be provided. In this case, the minimum value selecting unit 73 sets as the restricting value Ig, the smallest value among the steering angle restricting value Ien, the voltage restricting value Ivb, and the overheat protection restricting value.

In the embodiment described above, the restricting value setting unit 54 does not have to have the voltage restricting value calculating unit 72 and the steering angle restricting value Ien may be set as the restricting value Ig as it is. In the embodiment described above, the angle restricting component Iga may be constant, regardless of the vehicle speed SPD. The speed restricting component Igs may be constant, regardless of the vehicle speed SPD.

In the embodiment described above, the value resulting from subtracting the angle restricting component Iga and the speed restricting component Igs from the rated current Ir is set as the steering angle restricting value Ien. However, the steering angle restricting value Ien is not limited to this, and the calculation mode may be changed as needed, as long as the steering angle restricting value Ien is calculated so as to decrease based on the increase of the absolute value of the control steering angle θs and the absolute value of the control angular velocity ωs.

In the embodiment described above, the steering angle threshold may be set at an angle other than the end vicinity steering angle θne. In the embodiment described above, the control steering angle calculating unit 53 integrates the number of rotations of the motor 21 with the control steering angle θs when the rack shaft 12 is at the steering neutral position as the origin position. The control steering angle calculating unit 53 then calculates the control steering angle θs based on the number of rotations and the motor angle θm. However, the configuration is not limited to this, and a control steering angle and an end spacing angle may be calculated based on the number of rotations with the control steering angle at the rack end position as the origin position and the motor angle θm, and the restricting value Ig may be calculated based on the calculated control steering angle and the end spacing angle, for example. The origin position of the control steering angle may be stored beforehand when a vehicle is manufactured or may be set by learning through steering operation, for example.

In the embodiment described above, the control steering angle θs is calculated based on the motor angle θm of the motor 21. However, the configuration is not limited to this, and a sensor that detects, as an absolute angle, the rotation angle of the steering shaft 11 that is a rotary shaft may be provided, the rotation angle of which is able to be converted into the turning angle of the steered wheels 3, and the restricting value Ig may be calculated based on a detected value of the sensor.

In the embodiment described above, the EPS system 1 of a type in which the EPS actuator 5 applies the motor torque Tm to the column shaft 14 is the object to be controlled by the steering control device 6. However, the object to be controlled is not limited to this, and may be a steering device of a type in which the motor torque Tm is applied to the rack shaft 12 via a ball screw nut, for example. The object to be controlled is not limited to an EPS system, and may be a steer-by-wire-type steering device in which a steering unit that is operated by a driver and a turning unit that turns steered wheels are mechanically separated. The torque command value (q-axis current command value) of a motor of a turning actuator provided in the turning unit may be restricted to be equal to or less than a restricting value Ig, as in the embodiment.

The technical idea that can be developed from the embodiment and the modification described above will be described below. In the steering control device, the other restricting value includes a voltage restricting value that is calculated based on a power source voltage.

What is claimed is:

1. A steering control device that controls a steering device to which a motor torque that causes a steered shaft coupled to steered wheels to reciprocate is applied by an actuator including a motor as a driving source, the steering control device comprising:
a microcomputer, the microcomputer configured to:
calculate a torque command value that is a target value of a motor torque output by the motor,
set a restricting value that is an upper limit of an absolute value of the torque command value,
restrict the absolute value of the torque command value so as to be equal to or less than the restricting value,
control driving of the motor such that the motor torque follows the restricted torque command value,
calculate a steering angle restricting value that decreases based on an increase of both of (1) an absolute value of a rotation angle of a rotary shaft, the rotation angle of which is able to be converted into a turning angle of the steered wheels, and (2) an absolute value of an angular velocity of the rotary shaft, when the absolute value of the rotation angle of the rotary shaft exceeds a steering angle threshold based on the steering device, and
set the restricting value to be a value equal to or less than the steering angle restricting value, wherein: the microcomputer is configured to calculate the steering angle restricting value based on a value resulting from subtracting an angle restricting component and a speed restricting component from a rated torque that is set beforehand as a motor torque that is able to be output by the motor; the angle restricting component is calculated so as to increase based on the increase of the absolute value of the rotation angle when the absolute value of the rotation angle exceeds the steering angle threshold; and the speed restricting component is calculated so as to increase based on an increase of an exceeding amount of the angular velocity with respect to an upper limit angular velocity based on the absolute value of the rotation angle.

2. The steering control device according to claim 1, wherein at least one of the angle restricting component and the speed restricting component is calculated so as to decrease based on an increase of a vehicle speed.

3. The steering control device according to claim 1, wherein the microcomputer is configured to set, as the restricting value, a smallest one of another restricting value and the steering angle restricting value, the other restricting value being set based on a state quantity other than the rotation angle and the angular velocity.

* * * * *